US012312545B2

(12) United States Patent
Carbè

(10) Patent No.: US 12,312,545 B2
(45) Date of Patent: May 27, 2025

(54) PROCESS FOR GASIFYING AN ORGANIC MATERIAL AND PLANT FOR CARRYING OUT SAID PROCESS

(71) Applicant: ERS Engineering S.R.L., Turin (IT)

(72) Inventor: Paolo Carbè, Turin (IT)

(73) Assignee: ERS Engineering S.R.L., Turin (IT)

( * ) Notice: Subject to any disclaimer, the term of this patent is extended or adjusted under 35 U.S.C. 154(b) by 132 days.

(21) Appl. No.: 18/033,933

(22) PCT Filed: Oct. 26, 2021

(86) PCT No.: PCT/IT2021/050345
§ 371 (c)(1),
(2) Date: Apr. 26, 2023

(87) PCT Pub. No.: WO2022/091152
PCT Pub. Date: May 5, 2022

(65) Prior Publication Data
US 2024/0026237 A1 Jan. 25, 2024

(30) Foreign Application Priority Data

Oct. 26, 2020 (IT) .................. 102020000025321

(51) Int. Cl.
C10B 47/44 (2006.01)
C10B 57/10 (2006.01)
C10J 3/14 (2006.01)
C10J 3/66 (2006.01)

(52) U.S. Cl.
CPC ............. *C10J 3/66* (2013.01); *C10B 47/44* (2013.01); *C10B 57/10* (2013.01); *C10J 3/14* (2013.01);

(Continued)

(58) Field of Classification Search
CPC .. C10B 47/44; C10B 57/10; C10J 3/14; C10J 3/66
See application file for complete search history.

(56) References Cited

U.S. PATENT DOCUMENTS 3,871,839 A * 3/1975 Moody ............... C10J 3/54
48/210
4,927,430 A * 5/1990 Calderon ............ C10J 3/62
423/230

(Continued)

FOREIGN PATENT DOCUMENTS

EP 1312662 A2 * 5/2003 ............ C10J 3/482

OTHER PUBLICATIONS

International Search Report for PCT/IT2021/050345 mailed Feb. 28, 2022. 3 pgs.

*Primary Examiner* — Jonathan Miller
(74) *Attorney, Agent, or Firm* — Lerner David LLP

(57) ABSTRACT

Process for gasifying an organic material, comprising the following steps: subjecting an organic material to a drying phase to reduce its humidity content and obtain dry organic material and steam, and extracting said steam; subjecting the dry organic material to pyrolysis and generating a pyrolysis gas and a carbonaceous solid residue from the dry organic material, the pyrolysis gas containing a tar fraction; separating the pyrolysis gas from the carbonaceous solid residue, wherein separating the pyrolysis gas comprises extracting the pyrolysis gas and conveying it separately from the carbonaceous solid residue generated by the pyrolysis; subjecting the pyrolysis gas to a thermochemical treatment; and, after the thermochemical treatment, causing the treated pyrolysis gas to penetrate through a reducing bed (31) composed of the carbonaceous solid residue generated by the pyrolysis, and producing a synthesis gas. Subjecting the pyrolysis gas to a thermochemical treatment comprises:

(Continued)

subjecting the pyrolysis gas to a first combustion with a gasifying agent under sub-stoichiometric conditions by using ejecting nozzles (25) arranged below and upstream of the reducing bed (31), and obtaining the cracking of the tar fraction contained in the pyrolysis gas; and subjecting the pyrolysis gas to a second combustion introducing an additional gasifying agent in a chamber (20") arranged above and downstream of the ejecting nozzles (25) and upstream of an interface (23) separating the chamber (20") from the reducing bed (31), and completing the combustion of the tar fraction until the pyrolysis gas is fully converted to $CO_2$, $H_2O(g)$ and heat.

13 Claims, 2 Drawing Sheets

(52) U.S. Cl.
CPC .... *C10J 2200/152* (2013.01); *C10J 2200/158* (2013.01); *C10J 2300/0916* (2013.01); *C10J 2300/0976* (2013.01); *C10J 2300/1207* (2013.01)

(56) References Cited

U.S. PATENT DOCUMENTS

| | | | | |
|---|---|---|---|---|
| 8,100,991 B2* | 1/2012 | Sasauchi | ................... | C10J 3/84 423/644 |
| 8,790,428 B2* | 7/2014 | Tetzlaff | ................... | C10B 57/02 48/197 R |
| 9,279,089 B2* | 3/2016 | Chen | ......................... | F23G 5/24 |
| 10,144,887 B2* | 12/2018 | Li | ............... | C10J 3/66 |
| 11,459,518 B2* | 10/2022 | Gadsbøl | ..................... | C10J 3/66 |
| 2002/0020112 A1* | 2/2002 | Stivers | ....................... | C10J 3/16 48/198.2 |
| 2005/0247553 A1* | 11/2005 | Ichikawa | ............... | C10K 3/006 202/96 |
| 2009/0260286 A1* | 10/2009 | Sasauchi | .................... | C10J 3/24 48/89 |
| 2010/0319255 A1* | 12/2010 | Struble | ................. | C10K 3/001 48/197 R |
| 2011/0078951 A1* | 4/2011 | Blasiak | ..................... | C10J 3/721 202/99 |
| 2011/0083367 A1* | 4/2011 | Tetzlaff | ................... | C10B 53/02 48/209 |
| 2012/0161451 A1* | 6/2012 | Struble | ................. | C10K 1/002 422/600 |
| 2013/0185999 A1* | 7/2013 | Chen | ...................... | C10B 53/02 48/209 |
| 2013/0256113 A1* | 10/2013 | Tumiatti | ................. | C10B 49/14 422/187 |
| 2015/0122243 A1* | 5/2015 | Galloway | ................ | C10K 1/32 126/263.01 |
| 2015/0191664 A1* | 7/2015 | Li | ............... | C10J 3/20 422/162 |

* cited by examiner

PROCESS FOR GASIFYING AN ORGANIC MATERIAL AND PLANT FOR CARRYING OUT SAID PROCESS

CROSS-REFERENCE TO RELATED APPLICATIONS

The present application is a national phase entry under 35 U.S.C. § 371 of International Application No. PCT/IT2021/050345, filed Oct. 26, 2021, published in English, which claims priority to Italian Application No. 102020000025321, filed Oct. 26, 2020, the disclosures of which are incorporated herein by reference.

FIELD OF THE INVENTION

This invention generally refers to processes for gasifying organic materials.

BACKGROUND OF THE INVENTION

Gasification can be defined as the thermochemical conversion of a solid or liquid fuel into a gas in presence of a gasifying agent and other reagents (air/oxygen and/or water/steam) leading to its partial combustion. The process as a whole comprises, conceptually, three phases: a first highly exothermic combustion phase, a second pyrolysis phase and, finally, the conversion of carbon into gas (CO, $H_2CH_4$) or gasification as such. The gas produced in the process is generally referred as "syngas" or synthesis gas.

The terms pyrolysis refers to the thermal decomposition of fuel in absence of oxygen (except that which may already be present in the fuel), aimed to produce hydrocarbons in a solid (the so-called "char"), liquid or gaseous form. Depending mainly on the speed of the process it is possible to shift the result of the reaction towards lighter fractions (liquids and gases; fast pyrolysis) or heavy fractions (char and liquids; slow pyrolysis).

The main reactions occurring during gasification are:

$$C+O_2 \rightarrow CO_2 \text{ (Combustion)}$$

$$C+O+\tfrac{1}{2}O_2 \rightarrow CO \text{ (Partial Oxidation)}$$

$$C+H_2O \rightarrow CO+H_2 \text{ (Carbon Reforming)}$$

$$C+CO_2 \rightarrow 2CO \text{ (Boudouard Reaction)}$$

$$C+2H_2 \rightarrow CH_4 \text{ (Metanation)}$$

$$CO+H_2O(g) \rightarrow CO_2+H_2 \text{ (Water/Gas Shift Reaction)}$$

Two types of fixed bed gasifiers operating at atmospheric pressure are known.

The reactor is called fixed because the biomass inserted in the gas generator lies on a grid and moves down as it is consumed. The gasification therefore takes place under essentially static conditions.

The two types used are downdraft reactors (or co-current) and updraft reactors (or counter-current). The differentiation element is given by the direction of the flows of the solid and the gaseous fuel (gasifying agent and gas produced). Whilst in the updraft type the gas and the biomass move in opposite directions (upwards and downwards respectively), in the downdraft they move in the same direction (downwards).

This difference is crucial because it affects the very process to which the fuel is subjected, and the quality of the gas produced. In fact, the oxidation and reduction zones are inverted and, therefore, in the case of downdraft pyrolysis gases are forced to pass through the oxidation zone, at high temperature, favoring the thermal cracking of tar, with the result that the gas will have a condensation content of an order of magnitude less than the gas leaving the updraft reactor.

This low content of contaminants allows to use the gas produced directly in internal combustion engines to produce electricity.

For the same reason updraft reactors have more application difficulties in the production of electricity in internal combustion engines as they require a more driven cleaning. In general, their use is more advantageous in producing heat through direct combustion of gas produced in boilers.

The classic solutions have some fundamental characteristics in common:
- the processes that take place inside the reactor can only be controlled externally through two parameters: the flow rate of the gasifying agent and the negative pressure of the outgoing gases;
- the distribution of the reactions within the reactor takes place in a stratified manner;
- the thickness of the reaction layers and their temperatures are the result of delicate thermo-fluid dynamic balances achieved through a compromise aimed at finding the optimum on the outgoing gases (control and optimization of the single reaction is not possible);
- the gasifying agent, to be homogeneously distributed within the reactor, needs to find some passages within the biomass. This requirement sets a lower limit to the size of the biomass itself and the amount of dust present which are the main causes of reactor clogging.

US 2002020112 A1 shows a process and apparatus for obtaining fuels in gaseous and liquid form from waste materials, in particular solid waste. The apparatus includes an auger capable of transporting the material to be processed from a containment tank to a main reactor, where the material is stored in a reducing bed, heated and subjected to drying operations, pyrolysis and combustion to obtain vaporised oil and combustible gases. Pipelines are provided for the injection of steam into the reducing bed, said steam reacting with the combustion material to form hydrogen, carbon monoxide and dioxide.

Especially in downdraft reactors, whose peculiarity is to produce a clean gas such that it can be used in internal combustion engines, the homogenous distribution of the gasifying agent over the entire section of the reactor is fundamental for the thermal cracking of the tar.

It is essential to ensure that all gases produced in the previous pyrolysis reaction (the so-called "pyrogas") are subjected to a subsequent combustion reaction which raises their temperatures enough to destroy the longer hydrocarbons chains and preparing the gas for the subsequent phase of reduction. Any zones in which the presence of oxygen is not guaranteed, besides a reduction in the production of syngas, would allow the passage of the pyrogas as such and, consequently, the presence of "tar" (pyrolysis oil) in the outgoing gases (causing both clogging of the gas cleaning line, and failures in internal combustion engines).

In classical solutions, besides being prevented the possibility to optimise each phase, the use of small sized biomass as a fuel is limited, precisely because this would clog up the interstices that are used by the gasifying agent to distribute homogeneously within the reactor.

Another limitation of classic solutions is the presence of humidity inside the biomass which, during the heating phase, is converted into steam by subtracting heat from the process and occupying volume with the effect of suffocating and inhibiting other reactions.

The more one tries to increase the power produced by the plant by increasing the size of the reactor (scale-up), the more important the problem arises.

In order to overcome the limits imposed by single-stage gasification systems, multi-stage systems have been proposed, designed for the implementation of the process phases (pyrolysis, gasification and reduction) in several separate and sequential reaction chambers.

In this way, besides the optimization of the process conditions in each individual phase, that improving the quality of the syngas in output, it is possible to pre-treat the incoming fuel in the pyrolysis phase (less sensitive with respect to the following phases to the geometric pattern of biomass), thermally decomposing it into its main phases (pyrogas and char) which are in turn sent to different points in a subsequent reactor to facilitate their transformation into syngas.

Multi-stage systems are known, for example, from DE 10 2009 047 445 A1 and EP 2 808 377 A1. DE 10 2009 047 445 A1 describes a plant comprising a first reactor (pyrolysis screw) and a second reactor physically separated from the first. The second reactor consists in a fluidized bed gasifier which gasifies a biomass other than the one contained in the pyrolysis reactor. EP 2 808 377 A1 describes a plant comprising a pyrolysis reactor, an oxidation chamber and a physically separate reduction furnace. The pyrolysis gas produced in the pyrolysis reactor is treated in the oxidation chamber and then fed into the reduction furnace. The solid carbon residue produced in the pyrolysis reactor is fed into the reduction furnace.

Furthermore, US 2013185999 A1 shows an apparatus for converting a solid fuel into a gaseous fuel, comprising a pyrolysis zone capable of decomposing the solid fuel into a pyrolysis gas and a solid pyrolysis residue (coke); and a combustion zone, separated from the pyrolysis zone, which is suitable for the combustion of pyrolysis gas. The apparatus includes, where appropriate, ducts for conveying heated steam from specific drying means to a reducing bed located in the combustion zone.

The drawbacks and limitations of this configuration are obvious. First of all, the drying process of the combustible material takes place in an independent apparatus, physically separated from the main pyrolysis and combustion reactor, thus needing its own heating system. This has a negative impact on the efficiency of the production cycle and on the costs of realisation/maintenance of the plant. In addition, the steam fed into the reducing bed reacts directly with the solid material, thus requiring the presence of sufficient interstitial spaces within the biomass to be homogeneously distributed in the bed, not solving in fact the problem related to the size of the input material, with obvious disadvantages in terms of pollutant emissions, quality of final products and energy efficiency.

OBJECT OF THE INVENTION

Therefore, an object of the invention is to make available a multi-stage gasification process that allows the most complete removal of tar from the pyrolysis gas.

Another purpose of the invention is to make available a multi-stage gasification plant configured to allow the implementation of the gasification process as efficiently as possible. In particular, the different reactions involved in the gasification process take place in dedicated areas (reactors) and each in its own thermodynamic equilibrium.

SUMMARY OF THE INVENTION

It is thus provided a process for gasifying an organic material comprising the following steps:
  subjecting an organic material to a drying phase to reduce its humidity content and obtain dry organic material and steam, and to extract steam;
  subjecting the dry organic material to pyrolysis and generating a pyrolysis gas and a carbonaceous solid residue from the dry organic material, the pyrolysis gas containing a tar fraction,
  separating the pyrolysis gas from the carbonaceous solid residue, wherein separating the pyrolysis gas comprises extracting the pyrolysis gas and conveying it separately from the carbonaceous solid residue generated by the pyrolysis;
  subjecting the pyrolysis gas to thermochemical treatment; and
  after the thermochemical treatment, causing the treated pyrolysis gas to penetrate through a reducing bed composed of the carbonaceous solid residue generated by pyrolysis, and producing a synthesis gas, wherein subjecting the pyrolysis gas to a thermochemical treatment comprises:
  subjecting the pyrolysis gas to a first combustion with a gasifying agent under sub-stoichiometric conditions by using ejecting nozzles arranged below and upstream of the reducing bed, and obtaining the cracking of the tar fraction contained in the pyrolysis gas; and
  subjecting the pyrolysis gas to a second combustion introducing an additional gasifying agent in a chamber arranged above and downstream of the ejecting nozzles and upstream of an interface (23) separating the chamber (20") from the reducing bed (31), and completing the combustion of the tar fraction until the pyrolysis gas is fully converted to $CO_2$, $H_2O(g)$ and heat; wherein the additional gasifying agent is at least partially composed by steam extracted in the drying phase, wherein the treated pyrolysis gas is moved upwards by pressure difference through this interface between the chamber and the reducing bed, and flushed through the reducing bed, wherein this interface acts as a support for this reducing bed, and wherein the steam, extracted during the drying phase, is conveyed into special ducts, forced to pass through high temperature areas of the plant, and superheated before being used as an additional gasifying agent.

The invention further relates to a plant for carrying out the process according to the invention, comprising:
  a first screw reactor arranged with horizontal rotation axis (x), said first reactor being provided for subjecting the organic material to drying and pyrolysis and having a steam outlet, a pyrolysis gas outlet and a carbonaceous solid residue outlet;
  a second reactor comprising a lower chamber and an upper chamber, wherein in the lower chamber are arranged said ejecting nozzles which are connected to the pyrolysis gas outlet of the first reactor, and wherein in the upper chamber is arranged an additional gasifying agent supply; and
  a third reactor arranged below the carbonaceous solid residue outlet of the first reactor and above the second reactor, said third reactor comprising the reducing bed composed of the carbonaceous solid residue which is suppliable by gravity through the carbonaceous solid residue outlet and is supported by the interface which separates it from the second reactor; wherein the third reactor is in fluid communication with the second reactor through said interface.

Preferably, the first screw reactor shall be configured to maintain organic material in contact with the walls of the screw reactor.

In addition, the first reactor may have a hollow shaft for conveying hot combustion gases through this hollow shaft, with the aim of increasing the contact surface with the organic material and, therefore, the efficiency of the thermal processes described above.

According to the invention, organic material (biomass) is pretreated in the first reactor where the reaction can be expected to occur through indirect heat exchange, and not through combustible/comburent contact. From this phase a vapor component (steam), a solid carbonaceous component (char) and a volatile hydrocarbon component (pyrogas) are obtained.

Pyrolysis gases are collected and treated separately (tar-cracking and combustion) in order to optimise and focus this phase on the complete destruction of tar (the combustion involves only pyrogas).

The steam generated in the first part of the first reactor is taken, superheated within the system itself, and used to increase the reactions of carbon reforming and water/gas shift.

In particular, the steam entering the upper chamber of the second reactor is first superheated by interaction with the higher temperature zones of the plant (reduction and combustion zones) and, therefore, homogenised and mixed under stoichiometric conditions.

In the second reactor, therefore, an exclusively gas-gas reaction takes place between the additional gasifying agents, in particular superheated water vapor and pyrolysis gases pre-treated in the first reactor.

Steam is not fed directly into the solid material of the reducing bed, with significant advantages in terms of energy efficiency and emissions. The presence of a so called "stilling chamber" inside the second reactor, where the aforementioned gas-gas reaction takes place, promotes the achievement of ideal stoichiometric conditions and temperature for combustion.

Only at this point the products thus obtained, deprived of their long chain hydrocarbon components, can cross the carbon bed, created previously in the pyrolysis phase, to reduce and create syngas.

In this way, it is easier to control the physical-chemical parameters of the reactions, while the distribution of the combustible gases in the reducing bed is more homogeneous and uniform.

To simplify, it is a modified counter-current flow (updraft type) wherein pyrolysis gases pass through the combustion phase (as in the case of downdraft reactors), decomposing and giving rise to a gas with a lower tar content with respect to the one present in co-current reactors (downdraft).

A fundamental consequence deriving from the use of this invention consists in the possibility to use biomass with a high moisture content (which is internally converted into a gasifying agent), the absence of a lower limit of the biomass size (compatible with the use of waste) and, above all, no constraints on the scale-up of the plant.

BRIEF DESCRIPTION OF THE FIGURES

Further features and advantages of the process and plant according to the invention will become clear from the following detailed description made by way of non-limiting example with reference to the accompanying drawings, in which.

DESCRIPTION OF PREFERRED EMBODIEMENTS

Figure 1:
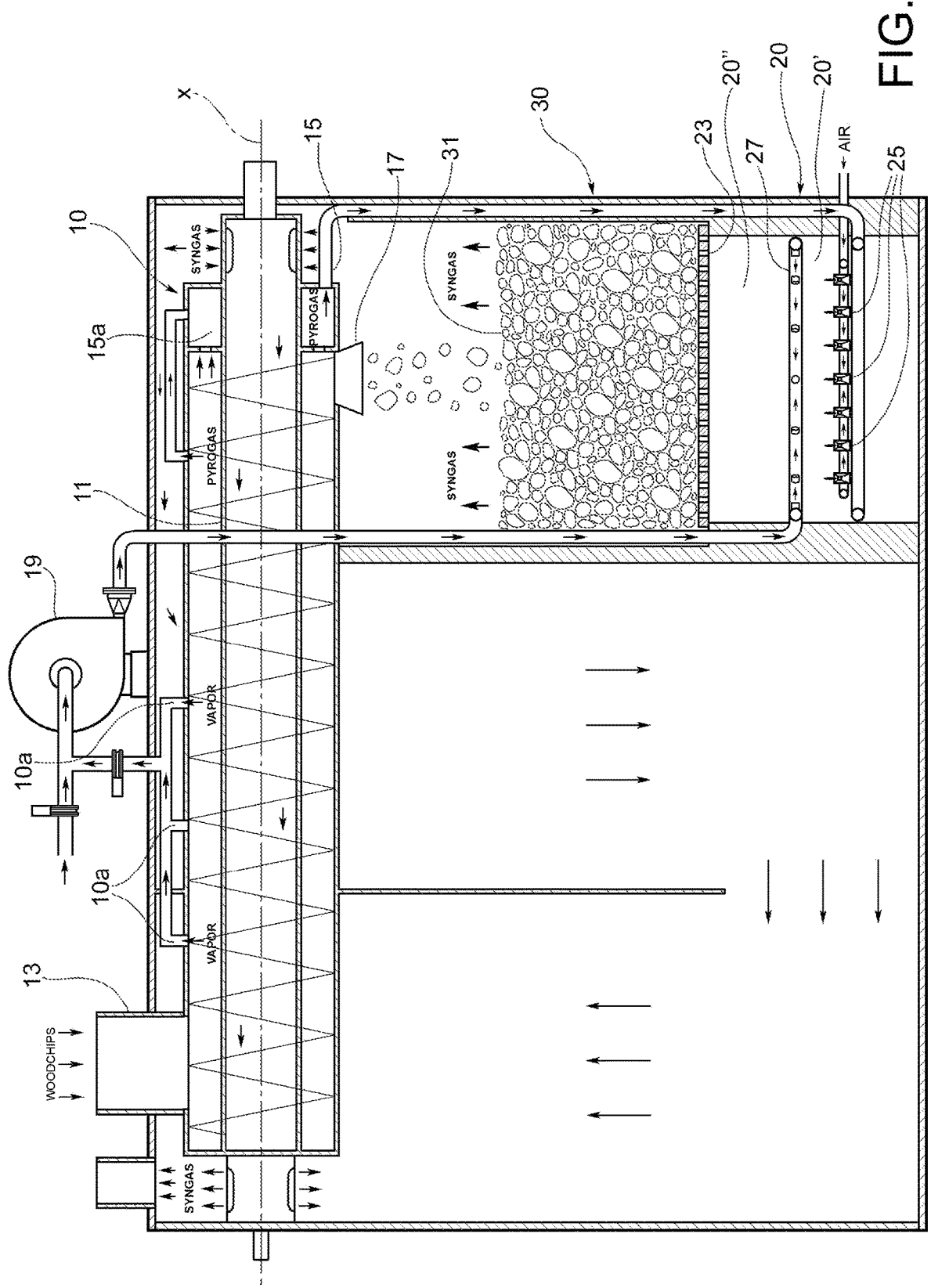
FIG. 1 schematically illustrates a plant adapted to implement a process according to the invention, and FIG. 2 schematically illustrates an ejecting nozzle used in the plant as shown in FIG. 1.

FIG. 1 illustrates a gasification plant comprising a plurality of separate reactors arranged within a containment structure essential to maintain these reactors in thermodynamic equilibrium.

The illustrated plant includes a first reactor 10 adapted to subject the organic material to drying and pyrolysis. The first reactor 10 is, in particular, a screw reactor, comprising a transport screw 11 arranged with horizontal×rotation axis. At opposite ends of reactor 10 are arranged respectively an organic material inlet 13, and a pyrolysis gas outlet 15 and a solid carbonaceous residue outlet 17.

The organic material inlet 13 includes a hopper for inserting organic material (usually crushed solid biomass) into reactor 10.

In the first section of reactor 10, where the temperatures are suitable for evaporation of the only moisture content present in the organic material, openings are obtained in the reactor mantle, through which it is taken, through a fan 19, the steam created during the drying phase.

The pyrolysis gas outlet 15 is intended for the removal of the volatile component (pyrogas or pyrolysis gas) of the organic material undergone to pyrolysis. At the gas outlet a collection chamber 15a is provided downstream of the pyrolysis reactor 10, to convey the pyrolysis gas. The solid carbonaceous residual outlet 17 is provided for the discharge of the solid carbonaceous residue resulting from the pyrolysis of the organic material.

In order to optimise the heat exchange and thus reduce the size of the reactor, the screw shaft is configured to maintain organic material in contact with the reactor walls, which are in turn in contact with the hot gases from the following combustion phase, which is the source of the thermal energy necessary for the pyrolysis process to take place. A further trick that can be adopted to increase the heat exchange surface, is to use, for the pyrolysis screw, a hollow shaft through which hot gases can be conveyed.

The plant also includes a second reactor 20 and a third reactor 30 arranged one above the other; in particular the third reactor 30 is located below the residual solid carbon output 17 of the first reactor 10 and above the second reactor 20. Advantageously, the first reactor 10, the second reactor 20 and the third reactor 30 are integrated into the same bearing structure in order to obtain a plant as compact as possible and to maintain the three reactors in thermodynamic equilibrium with each other.

The third reactor 30 comprises a reducing bed 31 composed of the solid carbonaceous residue discharged by gravity from the solid carbon residual outlet 17 of the first reactor 10. The reducer bed 31 is supported by a grid 23 serving as an interface between the third reactor 30 and the second reactor 20. Grid 23 therefore divides the third reactor 30, where the reducer bed 31 is located, from the second reactor 20, allowing only the passage of the reaction gases between said second reactor 20 and said third reactor 30.

As an alternative to the grid, another type of interface may be provided which allows upward feeding of the pyrolysis gas from the second reactor 20 to the reducing bed 21, as will be clarified below.

Figure 2:
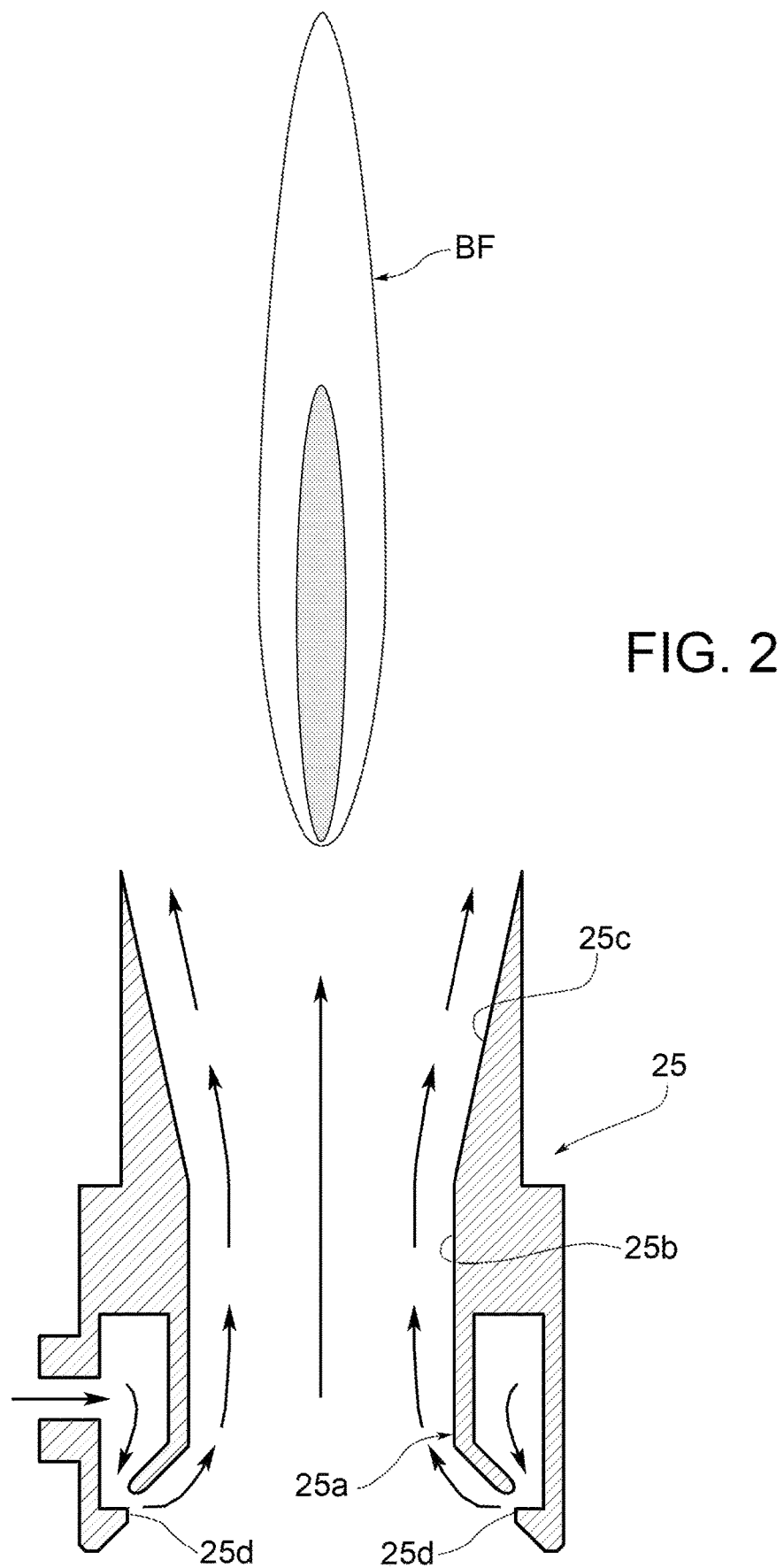

The second reactor 20 comprises a lower chamber 20' and an upper chamber 20". In the lower chamber 20' a plurality of ejecting nozzles 25 are placed, which are connected to the pyrolysis gas output 15 of the first reactor 10 through a pipeline. Ejecting nozzles 25 are also connected to a supply of gasifying agent, such as air. A nozzle 25 is schematically represented in FIG. 2. It has a central inlet 25a connected with the supply of the gasifying agent and provided with a shrinkage 25b and a divergent section 25c downstream of the shrinkage 25b.

Upstream of the shrinkage 25b a gas inlet 25d is obtained, connected with the pyrolysis gas outlet 15 of the first reactor 10. Thanks to Venturi effect, the passage of air in the central inlet 25a causes the aspiration of the pyrolysis gas 25d, while thanks to Coanda effect the gases are forced to follow the contour of the surface of the divergent section 25c. Overall, this results in an efficient mixing of the gasifying agent (air) with the pyrolysis gas. In FIG. 2, BF indicates a blue flame produced by the combustion of pyrolysis gas under sub-stoichiometric conditions.

In the upper chamber 20" of the second reactor 20, a supply of additional gasifying agent 27 is collocated at an intermediate level between the ejecting nozzles 25 and the reducing bed 31. The supply of additional gasifying agent 27 is connected to a blower outlet 19. The inlet of the blower 19 is connected, by means of control valves, to the steam outlet openings 10a of the first reactor 10 and to an air supply. The moisture content of the organic material, transformed into water vapor and superheated, can thus be at least partially used as an additional gasifying agent.

From the collection chamber 15a located downstream of the first reactor 10, the pyrogas is suctioned by the ejecting nozzles 25 which, thanks to Venturi effect together with Coanda effect, provide to mix the pyrogas with the oxygen contained in the gasifying agent under sub-stoichiometric conditions.

The high temperature of the injected pyrogas, combined with the presence of oxygen, gives place to a first combustion of the tar contained in the pyrogas and to a consequent breakage of the long chain hydrocarbons in simpler compounds.

In the following combustion chamber, defined in correspondence of the feeding additional gasifying agent 27, through nozzles provided in the additional feeding 27, a quantity of oxidizer necessary for the complete combustion of the tar is added.

At this stage, if deemed necessary, depending on the characteristics of the input biomass, the combustion air can be moistened with the steam taken from the pyrolysis reactor 10 to give rise to carbon reforming and Water/Gas Shift reaction.

The pyrolysis gas treated in the manner described above is then driven through the grid or interface 23 and, then, through the reducer bed 31 composed of char from the pyrolysis reactor 10. The gases coming from the combustion chamber (mainly $CO_2$ and $H_2O$) passing through this red-hot carbon bed undergo the subsequent reduction reactions (Boudouard reaction) obtaining the syngas with the desired composition (mainly CO, $H_2$ and, in lesser quantity, $CH_4$).

The hot gases, after this phase, are conveyed in such a way as to wrap the pyrolysis reactor 10 transmitting the necessary heat to let the required reactions occur within it.

Inside the plant additional chambers suitable to house materials may be provided with the function of catalyzing the process of breaking any tar still present, or to change the composition of the syngas itself by varying the percentages of gases present. In these chambers measures can also be provided for a first cleaning with reference to dust abatement.

It is evident that what is described is given only as a non-limiting example and that variations and modifications are possible to the expert without departing from the scope of the invention, as defined by the following claims.

The invention claimed is:

1. A process for gasifying an organic material, comprising the following steps:
    subjecting an organic material to a drying phase to reduce humidity content of the organic material and obtain dry organic material and steam, and extracting said steam;
    subjecting the dry organic material to pyrolysis and generating a pyrolysis gas and a carbonaceous solid residue from the dry organic material, the pyrolysis gas containing a tar fraction;
    separating the pyrolysis gas from the carbonaceous solid residue, wherein separating the pyrolysis gas comprises extracting the pyrolysis gas and conveying the pyrolysis gas separately from the carbonaceous solid residue generated by the pyrolysis;
    subjecting the pyrolysis gas to a thermochemical treatment, and after the thermochemical treatment, causing the treated pyrolysis gas to penetrate through a reducing bed composed of the carbonaceous solid residue generated by the pyrolysis, and producing a synthesis gas;
    wherein subjecting the pyrolysis gas to a thermochemical treatment comprises subjecting the pyrolysis gas to a first combustion with a gasifying agent under sub-stoichiometric conditions by using ejecting nozzles arranged below and upstream of the reducing bed, and obtaining the cracking of the tar fraction contained in the pyrolysis gas, and subjecting the pyrolysis gas to a second combustion introducing an additional gasifying agent in a chamber arranged above and downstream of the ejecting nozzles and upstream of an interface separating the chamber from the reducing bed, and completing the combustion of the tar fraction until the pyrolysis gas is fully converted to $CO_2$, $H_2O$ and heat,
    wherein the additional gasifying agent is at least partially composed by steam extracted in the drying phase, in which the treated pyrolysis gas is moved upwards by pressure difference through an interface between the chamber and the reducing bed, and flushed through the reducing bed, in which the interface acts as a support for the reducing bed, and in which the steam, extracted during the drying phase, is channeled into ducts, forced to pass through areas of a plant at high temperature, and overheated before being used as the additional gasifying agent.

2. The process according to claim 1, wherein said ejecting nozzles utilize Venturi and Coanda effects.

3. A system for carrying out the process according to claim 1, the system comprising:
    a first screw reactor arranged with horizontal rotation axis, said first reactor being provided for subjecting the organic material to drying and pyrolysis and having a steam outlet, a pyrolysis gas outlet and a carbonaceous solid residue outlet;

a second reactor comprising a lower chamber and an upper chamber,
wherein in the lower chamber are arranged said ejecting nozzles which are connected to the pyrolysis gas outlet of the first reactor, and wherein in the upper chamber is arranged an additional gasifying agent supply; and
a third reactor arranged below the carbonaceous solid residue outlet of the first reactor and above the second reactor, said third reactor comprising the reducing bed composed of the carbonaceous solid residue which is suppliable by gravity through the carbonaceous solid residue outlet and is supported by the interface which separates the third reactor from the second reactor;
wherein the third reactor is in fluid communication with the second reactor through said interface.

4. The system according to claim 3, wherein the screw of the first reactor is designed so as to maintain the organic material in contact with walls of said reactor.

5. The system according to claim 3, wherein the first screw reactor is provided with a hollow shaft adapted to conveying hot combustion gases through the organic material.

6. The system according to any of claim 3, wherein the steam outlet of the first reactor is connected to the additional gasifying agent supply.

7. The system according to claim 3, where the interface supporting the reducing bed is configured as a perforated gas permeable grid.

8. The system according to claim 4, wherein the first screw reactor is provided with a hollow shaft adapted for conveying hot combustion gases through the hollow shaft to increase contact surface with the organic material.

9. The system according to claim 4, wherein the steam outlet of the first reactor is connected to the additional gasifying agent supply.

10. The system according to claim 5, wherein the steam outlet of the first reactor is connected to the additional gasifying agent supply.

11. The system according to claim 4, where the interface supporting the reducing bed is configured as a perforated gas permeable grid.

12. The system according to claim 5, where the interface supporting the reducing bed is configured as a perforated gas permeable grid.

13. The system according to claim 6, where the interface supporting the reducing bed is configured as a perforated gas permeable grid.

* * * * *